(12) United States Patent  (10) Patent No.: US 9,143,447 B2
Ogawa  (45) Date of Patent: Sep. 22, 2015

(54) CLOSED LOOP FORMATION PREVENTING SYSTEM AND CLOSED LOOP FORMATION PREVENTING METHOD

(75) Inventor: Hideki Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 13/824,358

(22) PCT Filed: Aug. 9, 2011

(86) PCT No.: PCT/JP2011/068116
§ 371 (c)(1),
(2), (4) Date: Mar. 16, 2013

(87) PCT Pub. No.: WO2012/066830
PCT Pub. Date: May 24, 2012

(65) Prior Publication Data
US 2013/0176889 A1   Jul. 11, 2013

(30) Foreign Application Priority Data

Nov. 18, 2010   (JP) ................. 2010-257781

(51) Int. Cl.
*H04J 1/16*   (2006.01)
*H04L 12/721*   (2013.01)
(Continued)

(52) U.S. Cl.
CPC ............... *H04L 45/70* (2013.01); *H04L 12/12* (2013.01); *H04L 43/10* (2013.01); *H04L 45/18* (2013.01);
(Continued)

(58) Field of Classification Search
CPC ......... H04L 45/70; H04L 43/10; H04L 45/04; H04L 45/18; H04L 49/3009; H04L 12/12; H04L 47/10; H04L 2012/5631; H04L 47/15; H04L 47/2441; H04L 47/70; H04L 47/35; H04L 47/30; H04L 47/32; H04L 43/50; H04L 43/00; Y02B 60/35; H04J 3/14; H04B 17/00
USPC ......... 370/230, 235, 241, 248, 249, 389, 349, 370/395.31
See application file for complete search history.

(56) References Cited

U.S. PATENT DOCUMENTS 6,975,592 B1 * 12/2005  Seddigh et al. ............... 370/230
7,369,557 B1 *  5/2008  Sinha ........................... 370/392
(Continued)

FOREIGN PATENT DOCUMENTS

CN       101159981 A    4/2008
CN       101432721 A    5/2009
JP       2007-49495 A   2/2007

OTHER PUBLICATIONS

Chinese Office Action with a Search Report dated Nov. 26, 2014 with a partial English translation thereof.
(Continued)

*Primary Examiner* — Brenda H Pham
(74) *Attorney, Agent, or Firm* — McGinn IP Law Group, PLLC

(57) ABSTRACT

In an open flow network system in which there are a plurality of networks, in each of which one OFC (OpenFlow Controller) manages a plurality of OFSs (OpenFlow Switches), and a large network is formed by a combination of them, registration of a flow entry which forms a closed loop is prevented without a component and a procedure for cooperation of the plurality of OFCs. Specifically, after route calculation, the OFC temporarily registers an flow entry of a calculation result on a flow table of the OFS as the flow entry for a test. After that, the OFS flows the test packet according to the temporarily registered flow entry. When the test packet is routed without forming the closed loop, the OFS detects it and normally registers the flow entry for a first time. Detecting that the test packet forms a closed loop, the OFS deletes a temporarily registering flow entry and returns an error to the OFC.

9 Claims, 15 Drawing Sheets

(51) Int. Cl.
*H04L 12/26* (2006.01)
*H04L 12/705* (2013.01)
*H04L 12/935* (2013.01)
*H04L 12/12* (2006.01)
*H04L 12/715* (2013.01)

(52) U.S. Cl.
CPC ......... *H04L 49/3009* (2013.01); *H04L 43/0811* (2013.01); *H04L 45/04* (2013.01); *Y02B 60/34* (2013.01); *Y02B 60/35* (2013.01)

(56) References Cited

U.S. PATENT DOCUMENTS

| | | | | |
|---|---|---|---|---|
| 7,826,381 | B1* | 11/2010 | Kastuar et al. | 370/242 |
| 7,848,331 | B2* | 12/2010 | Belgaied et al. | 370/395.32 |
| 7,872,988 | B1* | 1/2011 | Hatley et al. | 370/252 |
| 8,107,382 | B2* | 1/2012 | Lin et al. | 370/244 |
| 8,284,665 | B1* | 10/2012 | Aybay et al. | 370/235 |
| 8,443,434 | B1* | 5/2013 | Zuk | 726/13 |
| 2003/0118036 | A1 | 6/2003 | Gibson et al. | |
| 2007/0253346 | A1 | 11/2007 | Nguyen et al. | |
| 2011/0295991 | A1* | 12/2011 | Aida | 709/223 |

OTHER PUBLICATIONS

English translation of PCT/ISA/237 (written opinion of the international searching authority, dated Sep. 13, 2011).
PCT/IB/373 dated Jun. 12, 2013.
International Search Report (ISR) (PCT Form PCT/ISA/210), in PCT/JP2011/068116, dated Sep. 13, 2011.
"The OpenFlow Switch Consortium", [online] the Internet (URL:http://www.openflowswitch.org/), Sep. 9, 2010.
"OpenFlow Switch Specification, Version 1.0.0", [online], Dec. 31, 2009, the Internet (URL:http://www.openflowswitch.org/documents/openflow-spec-v1.0.0.pdf), Dec. 31, 2009.
Nobuhiko Itoh et al, An Efficient Calculation of Passive Type Loop Detection Method and its Implementation on OpenFlow-based Network, IEICE Technical Report, vol. 109,No. 448, Feb. 25, 2010,pp. 31 to 36.
Yoichi Hatano et al, "An Efficient Measurement Flow Placement for QoS Degradation Locating on OpenFlow-based Network", IEICE Technical Report, vol. 109, No. 448, Feb. 25, 2010, pp. 25 to 30.

* cited by examiner

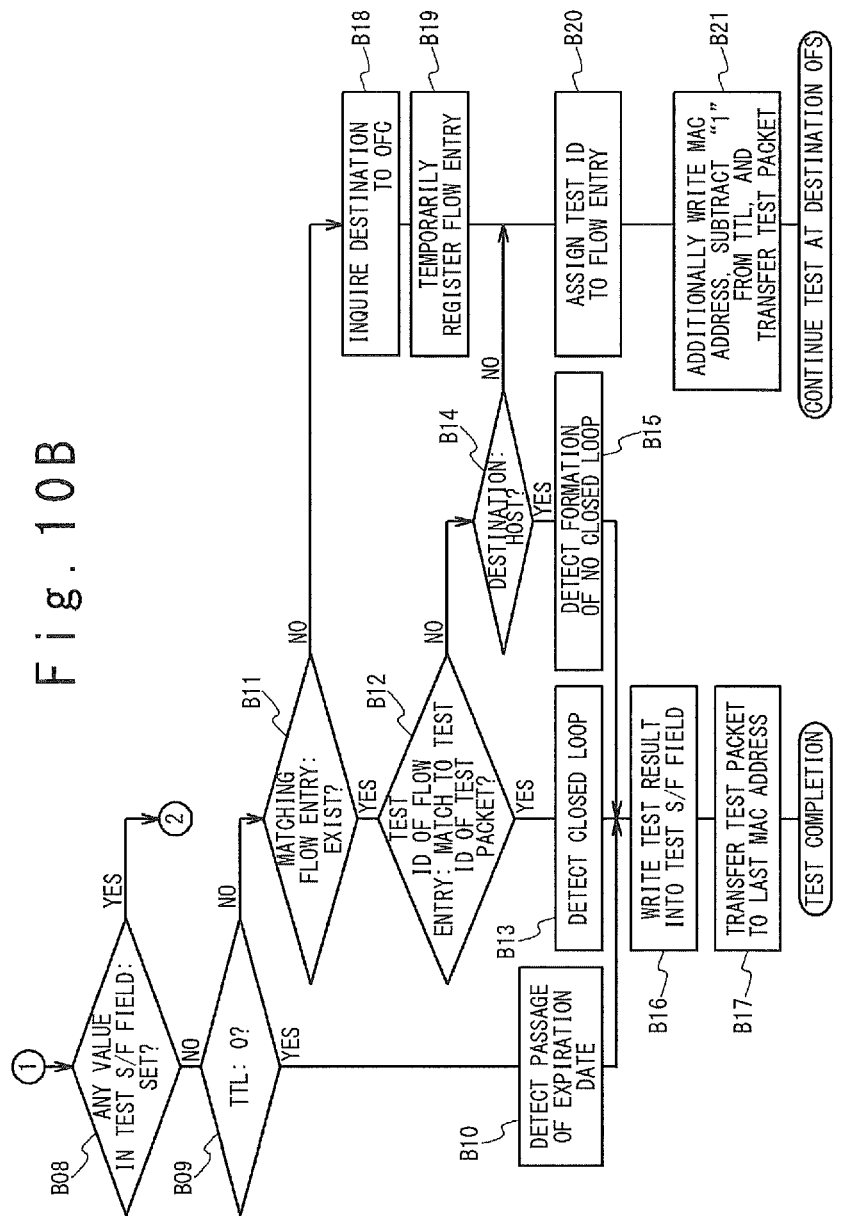

CLOSED LOOP FORMATION PREVENTING SYSTEM AND CLOSED LOOP FORMATION PREVENTING METHOD

TECHNOLOGY FIELD

The present invention relates to a closed loop formation preventing system, and especially to a closed loop formation preventing system in an open flow (OpenFlow) network.

BACKGROUND ART

As one of route control methods of the network communication, a route control method using an open flow (OpenFlow) technique which is a control protocol of communication equipment has been studied. A network in which the route control of the open flow technique is carried out is called an open flow network.

In the open flow network, a controller such as an OFC (OpenFlow Controller) controls the behaviors of switches such as OFSs (OpenFlow switches) by operating open flow tables of the switches. The controller and the switch are connected by a secure channel for control to control the switch by using a control message based on the open flow protocol.

The switch in the open flow network configures the open flow network, and is an edge switch and a core switch which are under the control of the controller. A series of steps of the packet from reception of a packet (communication data) in the edge switch on the input side in the open flow network to transmission by the output side edge switch is called a flow.

The open flow table is a table on which a flow entry which defines a predetermined action (process content) to be carried out to a packet group (packet series) matching to a predetermined rule (the match condition) is registered.

The rule of the flow entry is defined by various combinations of a part or all of a destination address, a source address, a destination port, and a source port to distinguish, which are contained in a header region of each protocol layer of a packet and can be identified. It should be noted that it is supposed that the above-described addresses contains a MAC address (Media Access Control Address) and an IP address (Internet Protocol Address). Also, in addition to the above, data of an ingress port is usable as the rule of the flow entry.

The action of the flow entry shows operations such as "outputting to a specific port", "discarding", "rewriting a header". For example, the switch outputs a packet to the port corresponding to this, if identification data (egress port number) of the output port is shown in the action of the flow entry, and discards the packet if the identification data of an output port is not shown. Or, the switch rewrites the header of the packet based on header data if the header data is shown in the action of the flow entry.

The switch in the open flow network executes the action of the flow entry to a packet group matching to the rule of the flow entry.

The details of the open flow technique are described to Non-Patent Literatures 1 and 2.

At present, the open flow technique is in a transition period from a research step to a practical use step. In such a situation, it would not be carried out to collectively replace existing legacy networks with the open flow networks. In many cases, a part of the existing network is replaced with the open flow compatible network and generally, a pilot test is carried out in a small-scale environment.

Also, usually, a large budget is not invested for such a pilot test, and the test is executed in a limited budget. In such a situation, in a "single controller type" of the existing technique, one new OFC must be prepared and it became an obstacle on the cost.

Also, it is ordinary that in the step of the pilot test, the OFC and the OFS are procured from various venders and a benchmark is taken. However, because the communication standard of the route calculation apparatus is not unified at present in an existing "route calculation apparatus cooperation method", a network cannot be built in which the products of various venders are mixed.

Also, on the other hand, in the current open flow network environment (open flow network system), because a small-scale environment for the pilot test is in a great part, enough consideration is not carried out to a problem which would be caused in the large-scale environment.

From such a situation, a technique is demanded which does not need a new apparatus, allows the mixture of the OFC and the OFSs of various venders, and also prevents formation of a closed loop in light-weight processing even in a large scale network.

(Configuration Example of Network)

A configuration example of the open flow network system will be first described with reference FIG. 1, before a conventional problem will be described.

There are a plurality of small-scale networks that one OFC manages a plurality of OFSs in the open flow network system shown in FIG. 1 and a large scale network is configured from a combination of the plurality of small-scale networks.

The open flow network system contains hosts (host computers) $10$ ($10$-$i$, i=1 to x: x is a total number), the OFSs $11$ ($11$-$j$, j=1 to y: y is a total number) and the OFCs $12$ ($12$-$k$, k=1 to z: z is a total number).

In the small-scale network, one OFC $12$ manages a plurality of OFSs $11$. Each of the small-scale networks is connected with other small-scale networks through the OFSs $11$ in an uppermost layer to configure a large-scale network.

The host $10$-$1$, the host $10$-$2$, the host $10$-$3$, and the host $10$-$4$ are connected with the OFS $11$-$2$ and the OFS $11$-$3$ by communications lines such as LAN cables. The OFS $11$-$2$ and the OFS $11$-$3$ are connected with the OFS $11$-$1$ with communications lines such as the LAN cables. It is supposed that the OFC $12$-$1$ carries out management such as route calculation for the OFS $11$-$1$, the OFS $11$-$2$, and the OFS $11$-$3$ and flow entry registration. In the same way, the host $10$-$5$, the host $10$-$6$, the host $10$-$7$ and the host $10$-$8$ are connected with the OFS $11$-$5$ and the OFS $11$-$6$ by communications lines such as the LAN cables. The OFS $11$-$5$ and the OFS $11$-$6$ are connected with the OFS $11$-$4$ by the communications lines such as the LAN cables. It is supposed that the OFC $12$-$2$ carries out the management such as route calculation for the OFS $11$-$4$, the OFS $11$-$5$, and the OFS $11$-$6$ and the flow entry registration. In the same way, the host $10$-$9$, the host $10$-$10$, the host $10$-$11$ and the host $10$-$12$ are connected with the OFS $11$-$8$ and the OFS $11$-$9$ by the communication lines such as the LAN cables. The OFS $11$-$8$ and the OFS $11$-$9$ are connected with the OFS $11$-$7$ by the communications lines such as the LAN cables. It is supposed that the OFC $12$-$3$ carries out management such as the route calculation for the OFS $11$-$7$, the OFS $11$-$8$, and the OFS $11$-$9$, and the flow entry registration. The OFS $11$-$1$ and the OFS $11$-$4$ are connected with the OFS $11$-$7$ by the LAN cables.

In this configuration, the OFC $12$-$1$, the OFC $12$-$2$ and the OFC $12$-$3$ do not have any component and procedure to exchange data mutually. That is, for example, there is no component and procedure to detect what flow entry the OFC $12$-$3$ registers on the OFS $11$-$7$ from the OFC $12$-$1$ and the OFC $12$-$2$.

(Generation of Flow Entry)

A plurality of flow entries with the format shown in FIG. 2 are registered on each of the OFSs 11 (11-$j$, $j$=1 to y).

(Format of Conventional Flow Entry)

As shown in FIG. 2, the flow entry has three fields of a "rule" field (region), an "action" field, and a "statistic data" field, when it is largely divided.

A "rule" (match condition) such as a packet type, a packet source host address, a packet destination host address is written in the rule field. The data of "IPv4" (Internet Protocol version 4), "IPv6" (Internet Protocol version 6) and so on is written in the packet type field.

An "action" (processing contents) showing how to process when receiving a packet matching to the rule, such as "discard" and "transferring to the OFS 11-$n$ (n is optional)" is written in the action field.

"Statistic data" such as a total number of the processed packets is written in the statistic data field.

As a first example, in some OFS, it is supposed that a flow entry is registered on a flow table, and in the flow entry, "192. 168. 10. *" is written in the rule field as a transmission source, and "discard" is written in the action field as the action. It should be noted that "*" is a wild card and means optional characters of an optional length (a character string equal to or more than 0 characters). That is, a part of "*" may be something. In this case, if "192. 168. 10" is contained in the head of the source IP address of the received packet, the received packet matches to the flow entry. When a packet from "192. 168. 10. 34" arrives at the OFS, the packet matches to the flow entry and discard processing is carried out.

As a second example, it is supposed that a flow entry is registered on a flow table and the flow entry has "*. *. *. *" written as a transmission source "192. 168. 20. *" written as a destination in the rule field, and "transfer to OFS 11-$n$" written in the action field. When a packet transferred from "192. 168. 10. 23" to "192. 168. 20. 25" arrives at the OFS, the packet matches to the flow entry and transfer processing is carried out so as to be transferred to the OFS 11-$n$. It should be noted that the OFS requests the OFC to register the flow entry when a packet matching to neither of the flow entries registered on the flow table is received. The OFC calculates an efficient route appropriately and registers a flow entry defining the route of the packet on the OFS. The OFS processes the received packet according to the flow entry.

(Configuration of a Closed Loop)

Next, a case that a closed loop is formed in a network configuration of FIG. 1 will be described with reference to FIG. 3.

The network shown in FIG. 3 contains the hosts (20-$i$, $i$=1 to x), the OFSs 21 (21-$j$, $j$=1 to y) and the OFCs 22 (22-$k$, $k$=1 to z).

The host 20 (20-$i$, $i$=1 to x) is equivalent to the host 10 (10-$i$, $i$=1 to x) of FIG. 1. The OFS 21 (21-$j$, $j$=1 to y) is equivalent to the OFS 11 (11-$j$, $j$=1 to y) of FIG. 1. The OFC 22 (22-$k$, $k$=1 to z) is equivalent to the OFC 11 (11-$k$, $k$=1 to z) of FIG. 1. The hosts 20 (20-1, $i$=1 to x), the OFSs 21 (21-$j$, $j$=1 to y) and the OFCs 22 (22-$k$, $k$=1 to z) belong to the networks 200 (200-$l$, $l$=1 to w: w is a total number of the small-scale networks). The hosts 20-1, the OFS 21-1 and the OFC 22-1 belong to the network 200-1. The OFS 21-2, the OFC 22-2, the host 20-4, the host 20-5, the OFS 21-4 and the OFC 22-4 belong to the network 200-2. The host 20-2, the hosts 20-3, the OFS 21-3 and the OFC 22-3 belong to the network 200-3. The hosts 20-6, the OFS 21-5 and the OFC 22-5 belong to the network 200-4.

It is supposed that the network address of "192. 168. 1. 0" is assigned to the network 200-1. It is supposed that the network address of "192. 168. 2. 0" is assigned to the network 200-2. It is supposed that the network address of "192. 168. 3. 0" is assigned to the network 200-3. It is supposed that the network address of "192. 168. 4. 0" is assigned to the network 200-4. It is supposed that the network address of "192. 168. 1. 5" is assigned to the host 20-1. It is supposed that the network address of "192. 168. 3. 10" is assigned to the host 20-2. It is supposed that the network address of "192. 168. 3. 21" is assigned to the host 20-3. It is supposed that the network address of "192. 168. 4. 8" is assigned to the host 20-6. Also, it is supposed that a flow entry in which "a packet destined to "192. 168. 1. *" is transferred to the host, and packets destined to other addresses are transferred to the OFS 21-2" is registered in the OFS 21-1. Also, it is supposed that a flow entry in which "a packet destined to "192. 168. 2. *" is transferred to the host, and packets destined to other addresses are transferred to the OFS 21-3" is registered in the OFS 21-2. Also, it is supposed that a flow entry in which "a packet destined to "192. 168. 3. *" is transferred to the host" is registered in the OFS 21-3. Also, it is supposed that a flow entry in which "a packet destined to "192. 168. 2. *" is transferred to the host, and a packet destined to other addresses is transferred to the OFS 21-5" is registered in the OFS 21-4.

In this case, when issuing a packet destined to the host 20-2, the host 20-1 transmits the packet to the OFS 21-1 first. The OFS 21-1 transfers the packet destined to the host 20-2 to the OFS 21-2 according to the flow entry. The OFS 21-2 transfers the packet destined to the host 20-2 to the OFS 21-3 according to the flow entry. The OFS 21-3 transfers the packet destined to the host 20-2 to the host 20-2 according to the flow entry. Thus, the packet destined to the host 20-2 arrives at the target host. That is, a route which passes through the OFS 21-1, the OFS 21-2 and the OFS 21-3 is established for the packet from the OFS 21-1 to the host 20-2.

Also, when the host 20-4 or the host 20-5 issues a packet destined to the host 20-6, it transmits the packet to the OFS 21-4 first. The OFS 21-4 transfers the packet destined to the host 20-6 to the OFS 21-5 according to the flow entry. The OFS 21-5 transfers the packet destined to the host 20-6 to the host 20-6 according to the flow entry. That is, a route which passes through the OFS 21-4 and the OFS 21-5 is established for the packet destined to the host 20-6 from the host 20-4 or the host 20-5.

In such a case, how a packet which is issued from the host 20-3 ad destined to the host 20-6 is routed is considered. When the host 20-3 issues a packet destined to the host 20-6, it transmits the packet to the OFS 21-3 first. However, any flow entry matching to the received packet is not registered on the OFS 21-3.

Therefore, the OFS 21-3 issues an inquiry to the OFC 22-3 about handling of the packet. However, the OFC 22-3 does not have a component and a procedure to detect what flow entries other OFCs set to the OFS managed by them.

When it is adequate to transfer the packet to the OFS 21-4 based on a calculation result of a route for the packet according to a route calculation routine, the OFC 22-3 newly registers a flow entry in which "the packet destined to "192. 168. 3. *" is transferred to the host, and the packet destined to other addresses is transferred to the OFS 21-4" to the OFS 21-3. In this case, a route 24-1 of "OFS 21-3→the OFS 21-4" is established. The OFC 22-3 transfers the packet to the OFS 21-4. The OFS 21-4 transfers the packet to the host 20-6 through the OFS 21-5.

On the other hand, when it is adequate to transfer the packet to the OFS 21-1 based on the calculation result of a route according to the route calculation routine, the OFC 22-3 newly registers a flow entry in which the packet destined to "192. 168. 3. *" is transferred to the host and the packets destined to other addresses are transferred to the OFS 21-1, in the OFS 21-3. In this case, the route 24-2 of "OFS 21-3→the OFS 21-1" is established. The OFC 22-3 transfers the packet to the OFS 21-1. Because the packet matches to any of the existing flow entries in the OFS 21-1, the OFS 21-1 transfers the packet to the OFS 21-2. Because the packet matches to any of the existing flow entries, the OFS 21-2 transfers the packet to the OFS 21-3. Because the packet matches to the newly registered flow entry, the OFS 21-3 transfers the packet to the OFS 21-1. In this way, because the closed loop 25-1 of "OFS 21-1→the OFS 21-2→the OFS 21-3→the OFS 21-1" is formed, the packet does not arrive at the target host.

From the above, when there are not a component and a procedure which detect what flow entry is already registered in the OFSs managed by another OFC, there is a possibility that a closed loop is formed.

(Kind of Closed Loop)

It should be noted that as a kind of closed loop, there are two kinds of a pattern shown in FIG. 4A and a patterns shown in FIG. 4B. The host 30 (30-*i*, i=1 to x) shown in FIG. 4A or FIG. 4B is equivalent to the host 10 (10-*i*, i=1 to x) of FIG. 1. The OFSs 31 (31-*j*, j=1 to y) shown in FIG. 4A and FIG. 4B are equivalent to the OFSs 11 (11-*j*, j=1 to y) of FIG. 1.

(Pattern 1)

In the pattern shown in FIG. 4A, the OFS 31-1 receives a packet from the host 30-1, and the packet matches to any of the flow entries and then the OFS 31-1 transfers the packet according to the newly registered flow entry. As a result, the packet arrives at the OFS 31-2. The packet matches to any of the existing flow entries in the OFS 31-2 and the OFS 31-3, and is transferred according to the matching flow entry. As a result, because the packet returns to the OFS 31-1 through the OFS 31-2 and the OFS 31-3, the closed loop has been formed among the OFS 31-1, the OFS 31-2 and the OFS 31-3.

(Pattern 2)

In the pattern shown in FIG. 4B, the OFS 31-4 receives a packet from the host 30-2, and the packet matches to the newly registered flow entry and is transferred according to the newly registered flow entry. As a result, the packet arrives at the OFS 31-6 through the OFS 31-4 and the OFS 31-5. The packet matches to an existing flow entry in the OFS 31-6, the OFS 31-7 and the OFS 31-8, and is transferred according to the existing flow entries. As a result, the packet returns to the OFS 31-6 through the OFS 31-7 and the OFS 31-8. Thus, a closed loop has been formed among the OFS 31-6, the OFS 31-7 and the OFS 31-8.

(Conventional Measure to Closed Loop Formation)

Conventionally, a "single controller method" shown in FIG. 5 and a "route calculation apparatus cooperation method" shown in FIG. 6 are proposed and implemented to the closed loop formation problem.

(Single Controller Method)

In the "single controller method" shown in FIG. 5, an OFC 12-4 is additionally provided to integrate the OFC 12-1, the OFC 12-2 and the OFC 12-3, in addition to the elements of FIG. 1. For example, in this configuration, the OFC 12-1 issues an inquiry to the OFC 12-4 when calculating the route of the packet. The OFC 12-4 takes account of the routes already set in the OFC 12-3 and the OFC 12-4 and sets a flow entry to the OFC 12-2 so as not to form the closed loop. However, as a drawback of the "single controller method", if the network scale becomes large, a data amount of the flow entries set in the respective OFCs and combinations necessary for the route calculation are enormous, so that the load of the OFC 12-4 becomes heavy.

(Route Calculation Apparatus Cooperation Method)

In the "route calculation apparatus cooperation method" shown in FIG. 6, a route calculating section 121-1 operating on the OFC 12-1, a route calculating section 121-2 operating on the OFC 12-2, and a route calculating section 121-3 operating on the OFC 12-3 are provided in addition to the components of FIG. 1. The route calculating sections 121-1, 121-2, and 121-3 exchange data of registered flow entries, and adds a mechanism for calculating the route. For example, in this configuration, the OFC 12-1 inquires data of the related flow entries to the OFC 12-2 and the OFC 12-3 when calculating the route of the packet. However, in the "route calculation apparatus cooperation method", too, if the network scale becomes large, the number of communicating OFCs and the number of the route data received from each OFC become enormous. Also, because the calculation must be carried out to combinations of them, the load of the OFC 12-1 becomes heavy.

CITATION LIST

[Non-Patent Literature 1]
"The OpenFlow Switch Consortium", [online] the Internet (URL:http://www.openflowswitch.org/)
[Non-Patent Literature 2] "OpenFlow Switch Specification, Version 1. 0. 0", [online] Dec. 31, 2009, the Internet (URL: http://www.openflowswitch.org/documents/openflow-spec-v1.0.0.pdf)

SUMMARY OF THE INVENTION

An object of the present invention may be to provide a closed loop formation preventing system in which the formation of a closed loop is checked previously and the check result is reflected on the flow entry registration, in an open flow (OpenFlow) network.

The closed loop formation preventing system according to the present invention contains a host which issues a packet; a switch which receives the packet and transfers the packet according to a flow entry registered on a flow table; and a controller which registers the flow entry on the flow table in response to an inquiry from the switch. The switch includes a processing section which confirms (checks) whether or not the received packet is a test packet; a processing section which confirms whether or not there is a flow entry matching to the received packet in the existing flow entries of the flow table when the received packet is not the test packet; a processing section which issues an inquiry to the controller when there is not the flow entry matching to the received packet; a processing section which forms the test packet based on a temporarily registered flow entry temporarily registered from the controller; a processing section which retains the received packet, transfers the test packet from the controller according to the temporarily registered flow entry, and detects a closed loop formation to start a test, and a processing section which discards the temporarily registered flow entry when detecting the closed loop formation as a result of the test process section.

The closed loop formation preventing method according to the present invention is implemented by a switch which transfers a packet based on an flow entry registered on the flow table. In the closed loop formation preventing method of the present invention, confirming whether or not a reception packet is a test packet. When the received packet is not the test packet, it confirms whether or not there is flow entry matching to the received packet in the existing flow entries of the flow table. When there is not a flow entry matching to the received packet, an inquiry is issued to a controller. Based on the temporarily registered flow entry temporarily registered from the controller, a test packet is generated. The received packet is retained, the test packet is transferred from the controller according to the temporarily registered flow entry, and a test starts to detect the closed loop formation. When detecting the closed loop formation as a result of the test, the flow entry temporarily registered from the controller is discarded.

A program according to the present invention is a program to make a switch execute of the steps of: confirming whether or not a received packet is a test packet; confirming whether or not there is a flow entry matching to the received packet in existing flow entries registered on a flow table when the received packet is not the test packet; transferring the received packet according to a matching flow entry when there is the flow entry matching to the received packet; issuing an inquiry to a controller when there is not any flow entry matching to the received packet; generating the test packet based on a temporarily registered flow entry temporarily registered from the controller; retaining the received packet; transferring the test packet according to the temporarily registered flow entry; starting a test to detect a closed loop formation; discarding the temporarily registered flow entry when detecting the closed loop formation as a result of the test. It should be noted that the program according to the present invention may be stored in a storage and a storage media.

In the present invention, the formation of a closed loop can be prevented previously without needing cooperation of controllers such as OFCs.

BRIEF DESCRIPTION OF THE DRAWINGS

FIG. 10B is a flow chart showing the processing routine of the OFS;

DESCRIPTION OF EXEMPLARY EMBODIMENTS

Hereinafter, exemplary embodiments of the present invention will be described with reference to the attached drawings. The present invention deals with an open flow network system as shown in FIG. 1.

Figure 1:
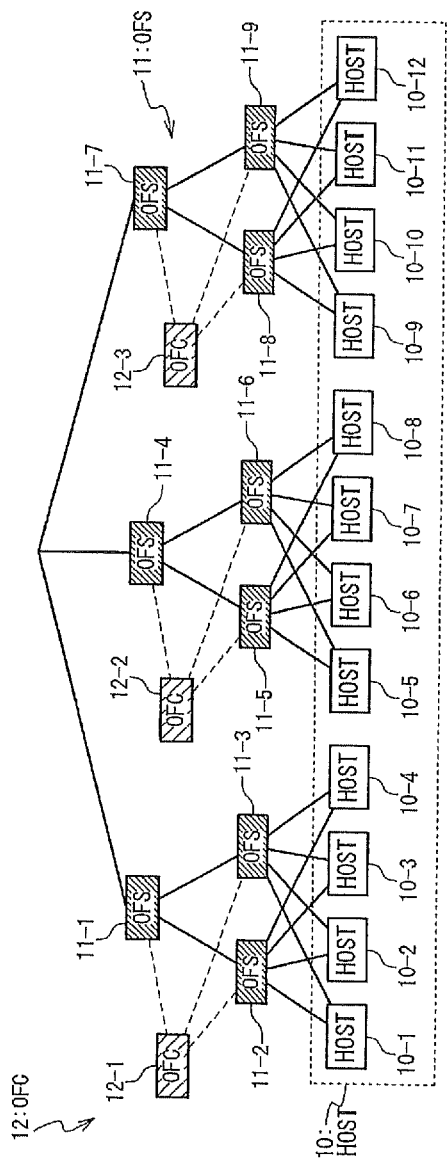
FIG. 1 is a diagram showing a configuration example of an open flow network system.

In the open flow network system shown in FIG. 1, there are a plurality of small-scale networks, in each of which one OFC manages a plurality of OFSs, and a large-scale network is formed by a combination of these networks.

The open flow network system contains hosts 10 (10-$i$, i=1 to x: x is a total number), OFSs 11 (11-$j$, j=1 to y: y is a total number) and OFCs 12 (12-$k$, k=1 to z: z is a total number).

In the small-scale network, one OFC 12 manages the plurality of OFSs 11. Each of the small-scale networks is connected with another small-scale network through the OFS 11 in the highest layer, and thus, the large-scale network is formed.

(Format of Flow Entry in this Invention)

Figure 2:
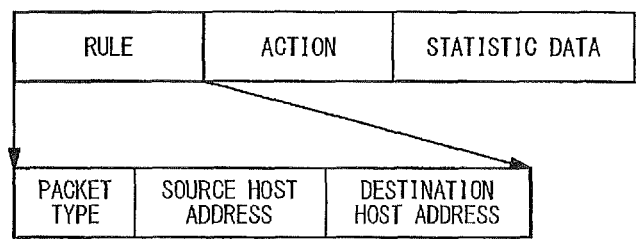
FIG. 2 is a diagram showing the format of a conventional flow entry.
Figure 3:
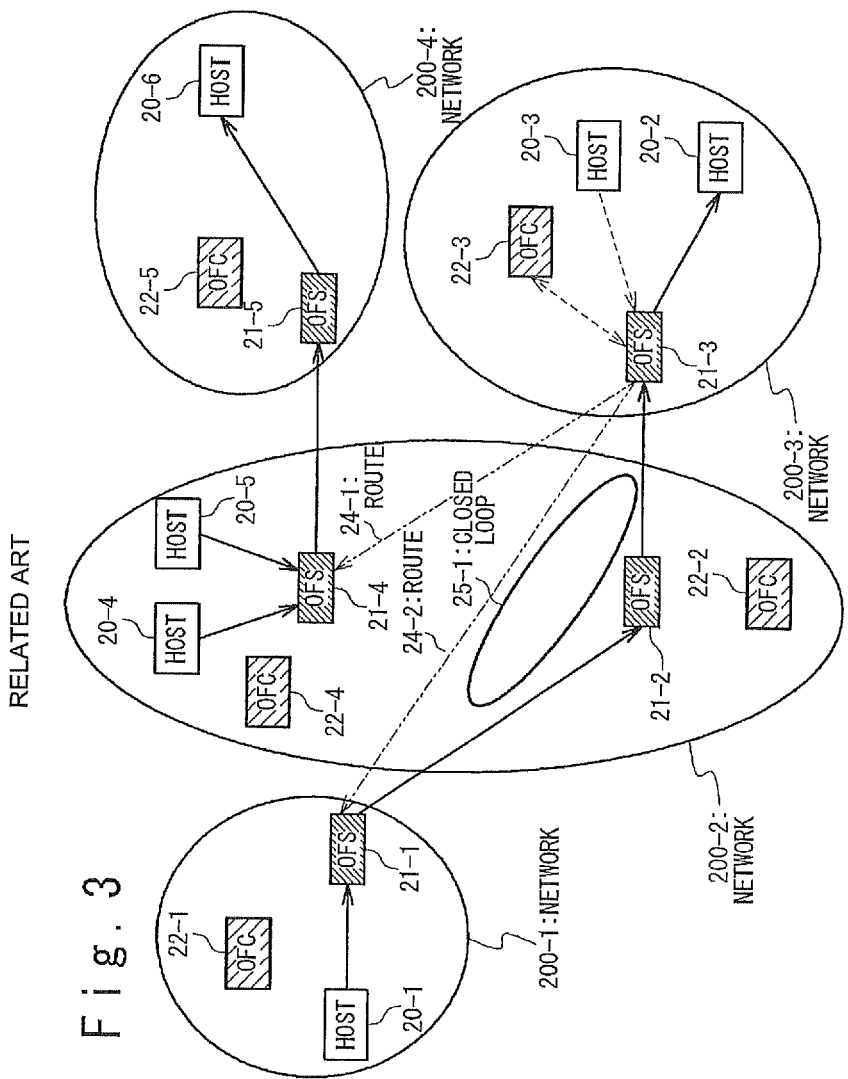
FIG. 3 is a diagram showing a situation in which a closed loop is formed, in the configuration of the open flow network system.
Figure 4A:
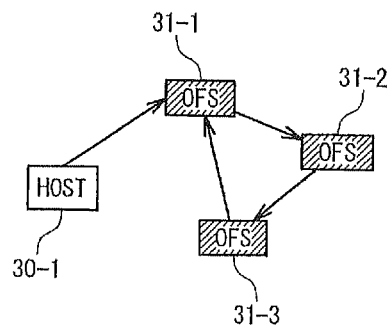
FIG. 4A is a diagram showing a pattern 1 of the closed loop.
Figure 4B:
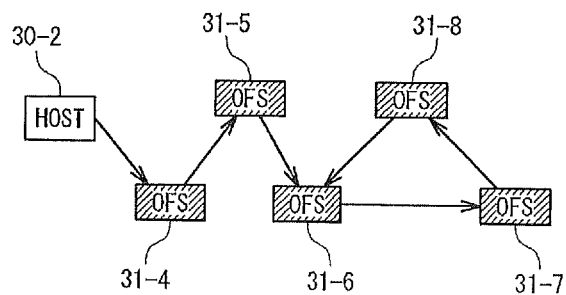
FIG. 4B is a diagram showing a pattern 2 of the closed loop.
Figure 5:
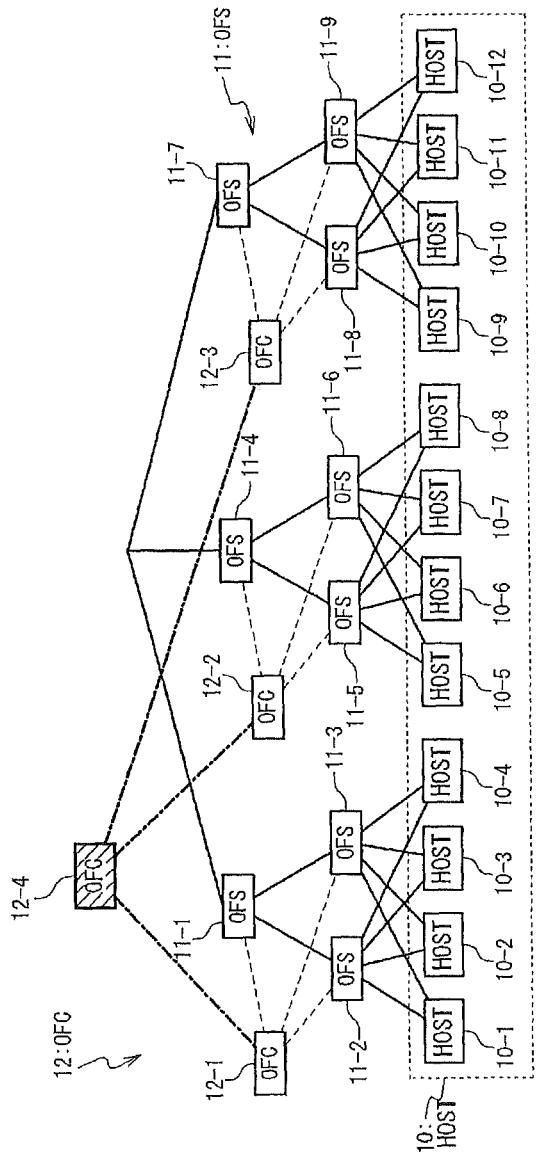
FIG. 5 is a diagram showing a conventional single controller method.
Figure 6:
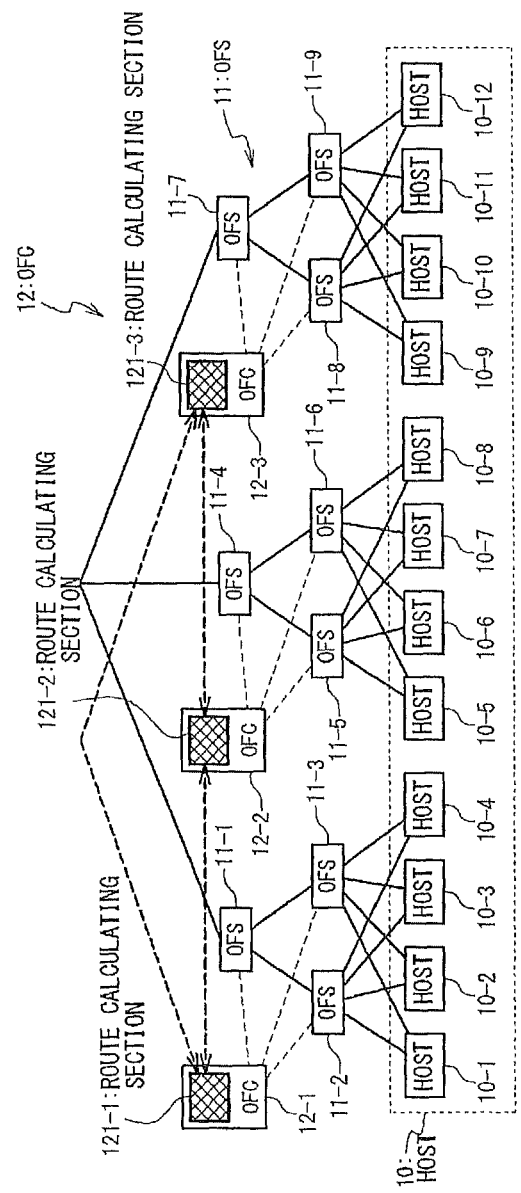
FIG. 6 is a diagram showing a conventional cooperation method of route calculation apparatuses.
Figure 7:
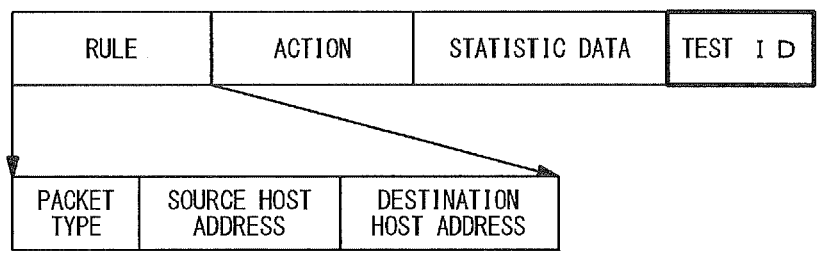
FIG. 7 is a diagram showing the format of a flow entry in the present invention.

FIG. 7 is a format of a flow entry used in the present invention. In the flow entry of the present invention, the flow entry of FIG. 2 is extended and a "test ID" field is added.

As shown in FIG. 7, the flow entry of the present invention is mainly divided into four fields of a "rule" field, an "action" field, a "statistic data" field, and a "test ID" field.

In the "rule" field, a rule (match condition) such as a packet type, a packet transmission source host address, and a packet transmission destination host address is written. The data of "IPv4" (Internet Protocol version 4) and "IPv6" (Internet Protocol version 6) and so on are written in the packet type field.

An action (process content), according to which a packet matching to the rule is processed upon reception, such as a "discarding" and "transferring to OFS 11-$n$ (n is optional)" is written in the "action" field.

Statistic data such as the number of packets processed is written in the "statistic data" field.

A "test ID" is written in the "test ID" field so as to identify a test uniquely.

(Format of Test Packet in this Invention)

Figure 8:
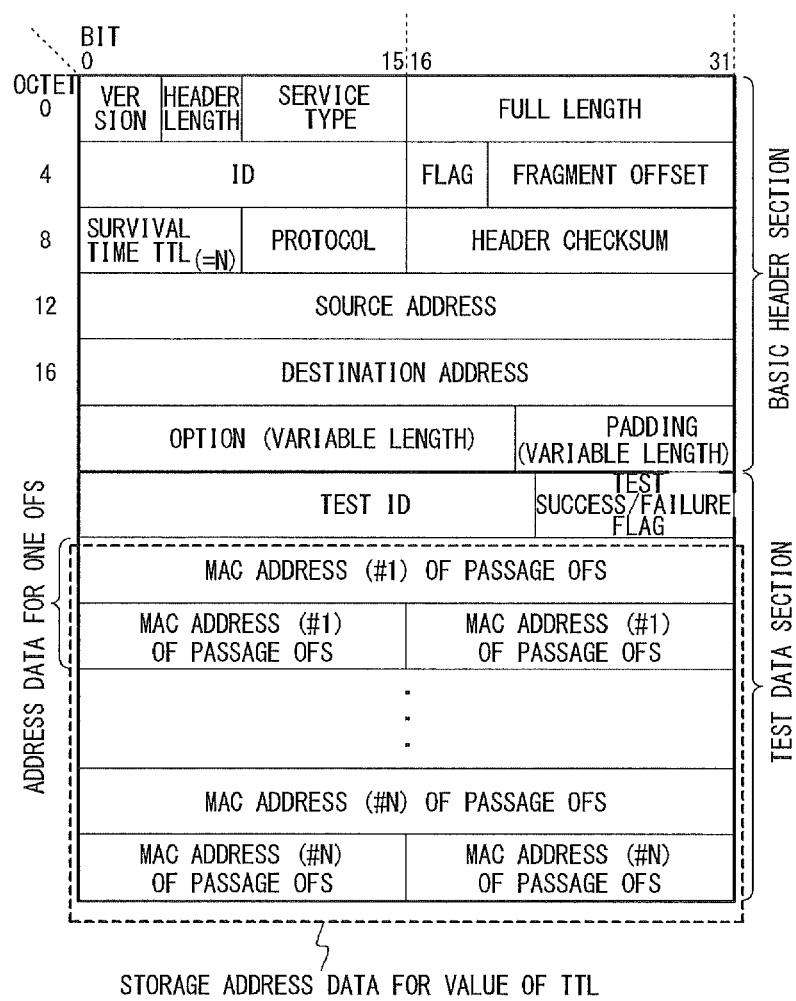
FIG. 8 is a diagram showing the format of a test packet in the present invention.

FIG. 8 shows a format of a test packet used in the present invention. Here, a case where the test packet is based on "IPv4" will be described, by using as an example.

The test packet has a basic header section and a test data section.

The test packet contains a "service type" (TOS: Type Of Service) field and a "protocol" field in the basic header section.

The "service type" field is supposed to have a size of the field enough to store "service type" data by which a service considered to be important when a packet is transferred can be uniquely distinguished.

The "Protocol" field is supposed to have a size of an area enough to store "protocol number" data by which an upper layer protocol can be uniquely distinguished.

The "service type" field and the "protocol" field show that the packet is a test packet for closed loop detection according to the present invention, based on a combination of values in the respective fields. That is, the "service type" field and the "protocol" field are used to distinguish whether or not the packet is the test packet for the closed loop detection according to the present invention.

Also, the test packet contains a "test ID" field, a "test success/failure (S/F) flag" field and a "passage OFS data" field in the test data section.

The "test ID" field is supposed to have a size of a filed enough to store the "test ID" data, which can be used to uniquely distinguish the test. For example, the OFC generates a unique "test ID" from a time and a MAC address of the OFC and so on.

The "test success/failure flag" field is supposed that a size of a field enough to store data indicative of four states (e.g. 2 bits) of "0" showing test incompletion, "1" showing the successful completion of the test, "2" showing the completion due to the test failure, and "3" showing that the incompletion of the routing due to expiration of survival time.

The "passage OFS data" is supposed to have a size of the field enough to store a plurality of MAC addresses and a plurality of port numbers. The MAC address and the port number are address data for one OFS. That is, a set of the MAC addresses and the port number are provided for one OFS. It is supposed that the MAC addresses of OFSs through which the test packet passes during the test are stored in the "passage OFS data" field in order. It should be noted that the "passage OFS data" field can store address data for a number indicated by a value of "survival time" (TTL: Time To Live) field in the basic header section. That is, an upper limit of the entry number of address data in the "passage OFS data" field is shown by a value of the "survival time" field.

(Explanation of Operation)

Next, (A) example of a test, (B) example of success/failure determination, and (C) example of result reflection will be described in order with reference to FIG. 9.

((A) Example of Test)

Figure 9:
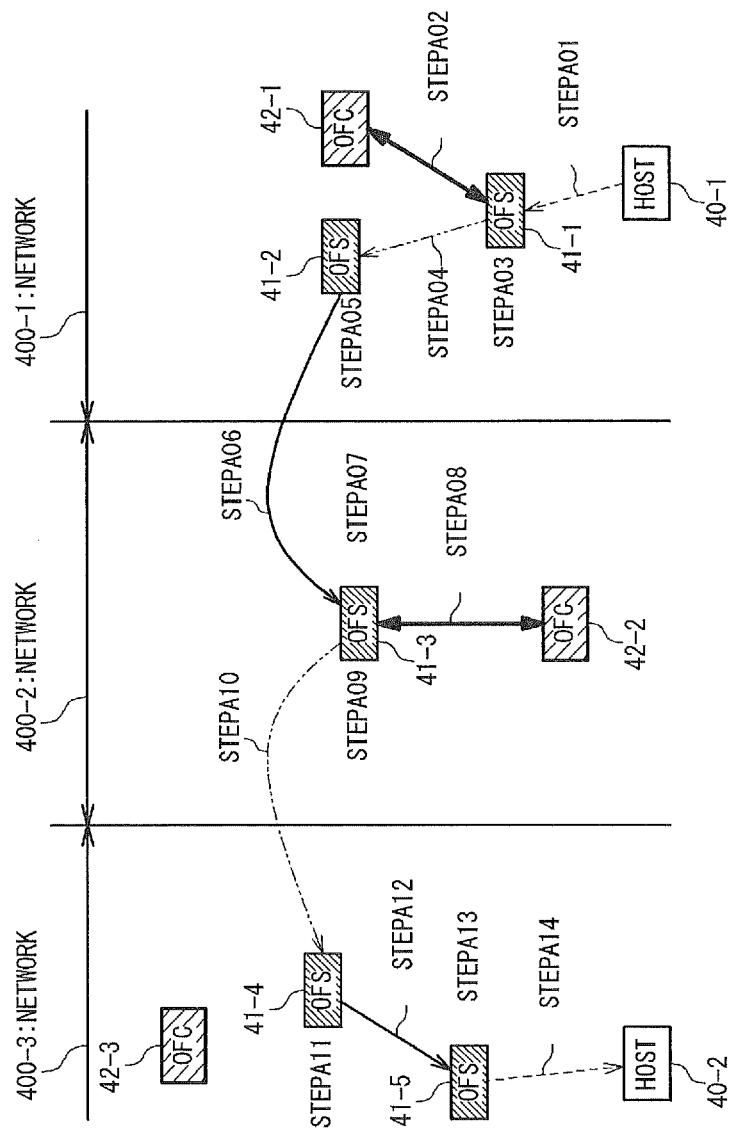
FIG. 9 is a diagram showing a test, a success/failure determination, and a result reflection in the present invention.

An open flow network system shown in FIG. 9 contains hosts 40 (40-*i*, i=1 to x), OFSs 41 (41-*j*, j=1 to y) and OFCs 42 (42-*k*, k=1 to z).

Here, the host 40 (40-*i*, i=1 to x) is equivalent to the host 10 (10-*i*, i=1 to x) of FIG. 1. The OFS 41 (41-*j*, j=1 to y) is equivalent to the OFS 11 (11-*j*, j=1 to y) of FIG. 1. The OFC 42 (42-*k*, k=1 to z) is equivalent to the OFC 11 (11-*k*, k=1 to z) of FIG. 1. The hosts 40 (40-*i*, i=1 to x), the OFSs 41 (41-*j*, j=1 to y) and the OFC 42 (42-*k*, k=1 to z) belong to a network 400 (400-*l*, l=1 to w). The hosts 40-1, the OFS 41-1 and the OFS 41-2 belong to a network 400-1, and the OFC 42-1 is supposed to manage the OFS 41-1 and the OFS 41-2. In the same way, the OFS 41-3 belongs to a network 400-2, and the OFC 42-2 is supposed to manage the OFS 41-3. In the same way, the host 40-2, the OFS 41-4 and the OFS 41-5 belong to a network 400-3, and the OFC 42-3 is supposed to manage the OFS 41-4 and the OFS 41-5.

(1) Step A01

The host 40-1 transmits a packet destined for the host 40-2 to the OFS 41-1. When receiving a packet, the OFS 41-1 determines whether a flow entry matching to the values of a destination address and a source address written in the packet exists in flow entries registered on a flow table.

(2) Step A02

Because there is not any flow entry having the values of the destination address and the source address written in the packet in the existing flow entries, the OFS 41-1 issues an inquiry to the OFC 42-1. The OFC 42-1 does not have components and a procedure to detect what flow entry is set in the network 400-2 and the network 400-3. The OFC 42-1 calculates a route according to a route calculation routine. When the calculation result is registered on the OFS 41-1 as a flow entry, the OFC 42-1 handles the flow entry as a temporarily registered flow entry. It is supposed that the OFC 42-1 writes the data showing temporary registration such as "TESTFORWARD" in the "action" field of the flow entry, so that it can be distinguished that the flow entry is in temporary registration. Also, the OFC 42-1 generates a unique "test ID" from the MAC addresses of the OFC 42-1 and the time and stores the "test ID" in the "test ID" field.

(3) Step A03

The OFS 41-1 temporarily retains the original packet received from the host 40-1. Also, the OFS 41-1 forms a test packet according to the format shown in FIG. 8. The OFS 41-1 stores a value distinguishably showing that a packet is the test (test packet), which is used for a test of the closed loop forming test, in the "service type" field and the "protocol" field of the basic header section when the test packet is generated. Also, the OFS 41-1 copies a value written originally in the received packet in a "survival time" field of the basic header section. Also, the OFS 41-1 stores the "test ID" generated by the OFC 42-1 in the "test ID" field of the test data section (i.e. the "test ID" described in the temporarily registered flow entry). Also, the OFS 41-1 stores a value (e.g. "0") showing a test incompletion status in the "test success/failure flag" field of the test data section. Also, the OFS 41-1 stores values of the port number and the MAC address of the OFS 41-1 in a "passage OFS data" field of the test data section.

(4) Step A04

The OFS 41-1 transfers the test packet generated as described above to the OFS 41-2 according to the temporarily registered flow entry.

(5) Step A05

The OFS 41-2 checks the values of the service type and the protocol type of the arriving packet to detect that the test packet has arrived. The OFS 41-2 adds values of the port number and the MAC address of the OFS 41-2 to the "passage OFS data" field of the test data section of the test packet. The OFS 41-2 determines whether any flow entry matching to the values of the destination address and the source address of the test packet exists in flow entries of its own flow table. In this example, because there is the flow entry matching to the values of the destination address and the source address of the test packet in the existing flow entries of its own flow table, the OFS 41-2 checks whether or not a value (test ID) identical with data of the "test ID" field of the test packet is written into the "test ID" field of the flow entry. When the value identical to the data of the "test ID" field of the test packet is not written in the "test ID" field of the flow entry, the OFS 41-2 writes the value (test ID) written in the "test ID" field of the test packet in the "test ID" field of the flow entry. Because the fact that the value identical to the data of the "test ID" field of the test packet is already written into the "test ID" field of the flow entry shows the closed loop formation, the OFS 41-2 completes the test as the test failure at this point. In this case, regarding that the test is not in failure, the test is continued.

(6) Step A06

The OFS 41-2 transfers the test packet to the OFS 41-3 according to the existing matched flow entry.

(7) Step A07

The OFS 41-3 checks the values of the service type and the protocol type of the arriving packet and detects that the test packet has arrived. The OFS 41-3 adds a value of the port number and the MAC address of the OFS 41-3 to the "passage OFS data" field of the test packet. The OFS 41-3 determines whether there is a flow entry matching to the values of the destination address and the source address of the test packet in the existing flow entries of its own flow table.

(8) Step A08

Because there is not any flow entry matching to the values of the destination address and the source address of the test packet in the existing flow entries of its own flow table, the OFS 41-3 requests the OFC 42-2 to set a flow entry of temporary registration. The OFC 42-2 calculates a route based on a route calculation routine. The OFC 42-2 sets this flow entry as a temporarily registered flow entry when the calculation result is registered on the OFS 41-3 as the flow entry. Also, it is supposed that the OFC 42-2 writes the data such as "TESTFORWARD" in the "action" field of the temporarily registered flow entry, to show distinguishably the temporary registration, like step A03.

(9) Step A09

The OFS 41-3 stores the value written in the "test ID" field of the test packet in the "test ID" field of the temporarily registered flow entry.

(10) Step A10

The OFS 41-3 transfers the test packet to the OFS 41-4 according to the temporarily registered flow entry.

(11) Step A11

The OFS 41-4 checks the values of the service type and the protocol type of the arriving packet and detects that the test packet has arrived. The OFS 41-4 adds a value of the port number and the MAC address of the OFS 41-4 to the "passage OFS data" field of the test test packet. The OFS 41-4 determines whether there is a flow entry matching to the values of the destination address and the source address of the test packet in the existing flow entries of its own flow table. In this example, because there is the matching flow entry, the OFS 41-4 checks whether or not a value identical to the data of the "test ID" field of the test packet is not written into the "test ID" field of the flow entry, like the step A05. When the value identical to the data of the "test ID" field of the test packet is not written into the "test ID" field of the flow entry, the OFS 41-4 writes the value written in the "test ID" field of the test packet in the "test ID" field of the flow entry. When the value identical to the data of the "test ID" field of the test packet is already written into the "test ID" field of the flow entry, the OFS 41-4 completes the test as the test failure at this point, because it means that a closed loop has been formed. Here, the test is not failed, and the test is continued.

(12) Step A12

The OFS 41-4 transfers the test packet to the OFS 41-5 according to the existing matching flow entry.

(13) Step A13

The OFS 41-5 checks the values of the service type and the protocol type of the arriving packet and detects that the test packet has arrived. The OFS 41-5 adds a value of the port number and the MAC address of the OFS 41-4 to the "passage OFS data" field of the test packet. The OFS 41-5 determines whether there is a flow entry matching to the values of the destination address and the source address of the test packet in the existing flow entries of its own flow table. In this example, because there is a matching flow entry, the OFS 41-5 checks whether the value identical to the data of the "test ID" field of the test packet is not written into the "test ID" field of the flow entry, like steps A05 and step A11. When the value identical to the data of the "test ID" field of the test packet is not written into the "test ID" field of the flow entry, the OFS 41-5 writes the value written in the "test ID" field of the test packet in the "test ID" field of the flow entry. When the value identical to the data of the "test ID" field of the test packet is already written into the "test ID" field of the flow entry, the OFS 41-5 completes the test as the test failure at this point, because it means that a closed loop has been formed. Here, the test is regarded to be not in the test failure, and the test is continued.

(14) Step A14

The OFS 41-5 transfers the test packet to the host 40-2 according to the existing matched flow entry.

((B) Example of Success/Failure Determination)

(A) Steps A01 to A14 are an example of a case that the closed loop is not generated.

Because the OFS can determine that a packet can be transferred to a host different from the transmission source host, at step A13 and step A14, it is determined to be in the test success at this point, and it is supposed that the value "1" is stored in the "test success/failure flag" field of the test packet to show the test success and the test completion.

On the other hand, in case of the test failure, when there is a flow entry matching to the test packet in the existing flow entries of its own flow table, and the value (test ID) identical to the data of the "test ID" field of the flow entry is written in the "test ID" field of the test packet, this means the packet enters an already once passed route again. Thus, a closed loop has been formed.

Therefore, in this case, the OFS stores the value "2" in the "test success/failure flag" field of the test packet to show the test failure and the test completion. Also, although not shown in FIG. 9, the value (e.g. "3") is stored to show the test failure due to the expiration of the survival time, because it shows the expiration of the survival time of the packet that the value of the "survival time" (TTL) field becomes 0 during the transfer of the test packet. This case will be described in a "processing routine of OFS" (see FIG. 10A) later.

[(C) Example of Result Reflection]

The test completes in success or failure in either of the OFSs by continuing to transfer the test packet, like the above-mentioned (A) and (B) examples.

In order to reflect the test result, the OFS writes the value of the test result into the "test success/failure flag" field, and then executes clean-up processing of the flow entry.

(Clean-Up Processing of Test Packet)

Because its own MAC address is described in the end portion of the "passage OFS data" field of the test data section of the test packet, when the object of the clean-up processing is the test packet, the OFS deletes this MAC address.

(Clean-Up Processing of Normally Registered Flow Entry)

When the object of the clean-up processing is normally registered flow entry, the OFS deletes the test ID corresponding to itself from the "test ID" field of the flow entry regardless of the success/failure of the test, and deletes the data given during the test.

(Clean-Up Processing of Temporarily Registered Flow Entry)

When the object of the clean-up processing is the temporarily registered flow entry, the OFS carries out the clean-up processing according to the success/failure of the test. For example, the OFS deletes the temporarily registered flow entry itself in case of the test failure. Also, in case of the test success, the OFS rewrites the data of the "action" field of the temporarily registered flow entry to update the temporarily registered flow entry to the normally registered flow entry.

The OFS reflects the test result to the test packet and the flow entry as mentioned above.

When the above clean-up processing completes, the OFS transfers the test packet to the OFS which has a MAC address described in the end portion of the "passage OFS data" field of the test data section of the test packet based on the MAC address.

The destination OFS, too, carries out the clean-up processing. By repeating this, finally, the state that any MAC address is not present in the test packet is achieved. At this time, the test packet returns to the generation source OFS. Here, in case of the test success, the OFS transfers the packet in the pending state in the OFS according to the normally registered flow entry, like the above-mentioned (A), (B), and (C). Also, the OFS discards the packet in the pending state in case of the test failure, and returns an error to the OFC which has executed the route calculation.

Figure 10A:
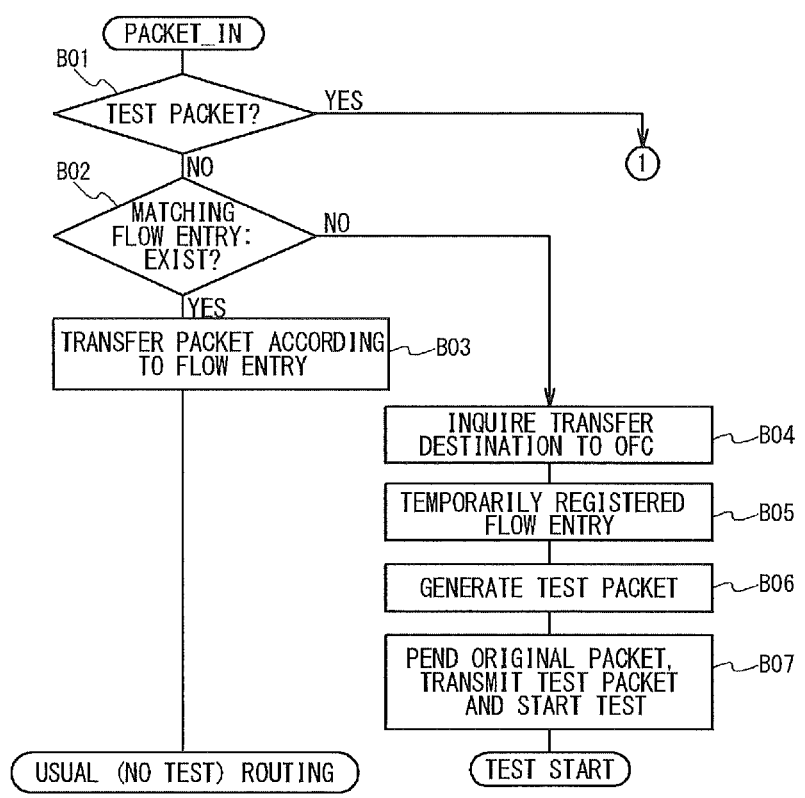
FIG. 10A is a flow chart showing the processing routine of an OFS.
Figure 10C:
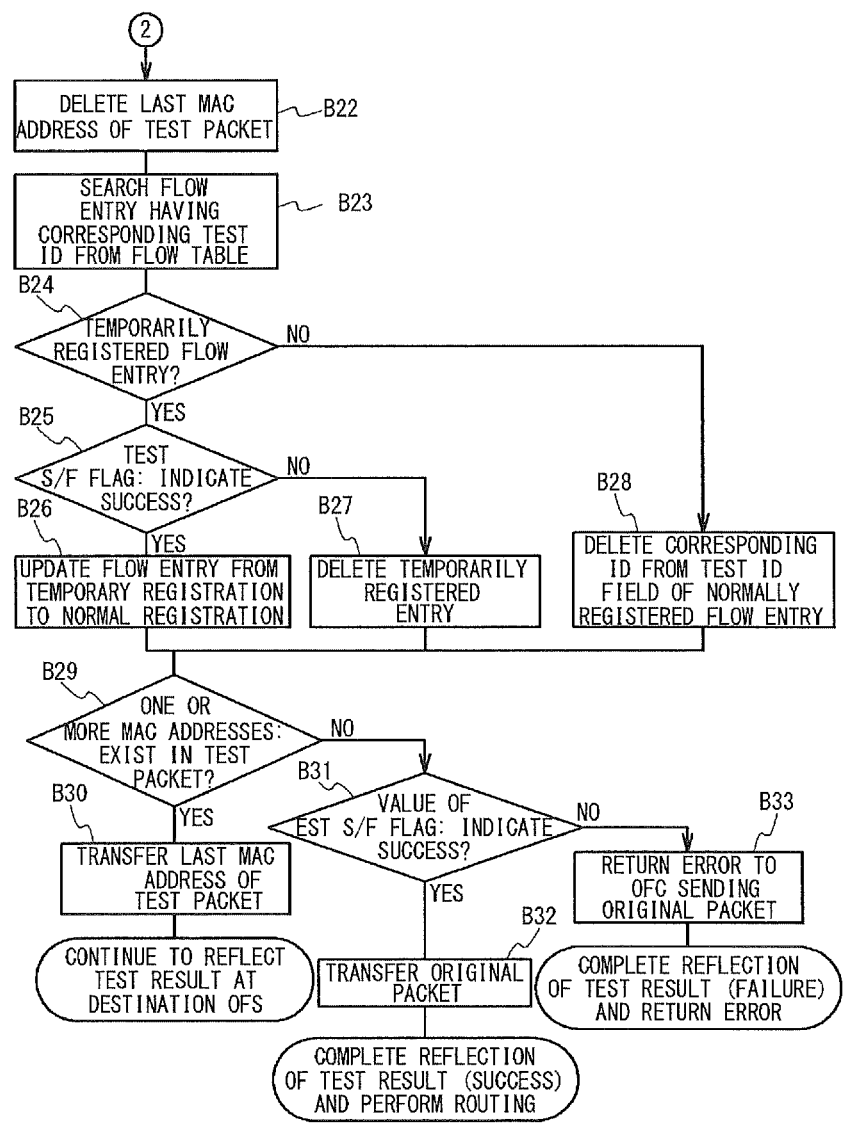
FIG. 10C is a flow chart showing the processing routine of the OFS.

The above (A), (B), and (C) examples are realized by the flow entry shown in FIG. 7, the test packet shown in FIG. 8, and the processing routine of the OFS shown in FIG. 10A to FIG. 10C. The processing routine of the OFS is implemented as firmware (FW).

(Process Routine of OFS)

The processing routine of the OFS will be described using FIG. 10A, FIG. 10B and FIG. 10C.

(1) Step B01

When receiving a packet, the OFS confirms (checks) whether the received packet is a test packet by referring to the "service type" field and the "protocol" field of the header section of the packet.

(2) Step B02

When the received packet is not the test packet, the OFS determines whether a matching flow entry in the existing flow entries of its own flow table based on the data of the "source address" field the "destination address" field in the header section of the packet.

(3) Step B03

When there is the matching flow entry in the OFS, the processing such as transfer is carried out according to the entry.

(4) Step B04

The OFS Inquires a route to the OFC when there is not any matching flow entry. The OFC calculates the route and generates a test ID.

(5) Step B05

The OFC temporarily registers the flow entry on the OFS based on the calculation result. The OFC writes the effect that the transfer is carried out based on the temporarily registered flow entry, in the "action" field of the temporarily registered flow entry. Also, the OFC writes the generated test ID in the "test ID" field of the temporarily registered flow entry.

(6) Step B06

The OFS generates a test packet. The generation of the test packet is as described at step A03.

(7) Step B07

The OFS holds the received original packet in a pending state, and transfers the test packet formed with step B06 according to the flow entry which temporarily registered at step B05. Thus, the test starts.

(8) Step B08

Also, when the packet received at step B01 is the test packet, the OFS determines that the current status is in the test processing or the reflection processing of the test result, based on the value of the test success/failure flag.

(9) Step B09

When any value is not set in the "test success/failure flag" field (or the value is 0) at step B08, the OFS determines that the current status is in the test processing and confirms whether or not the value of the "survival time" field is 0.

(10) Step B10

It determines that it is that expiration of survival time breaking of the packet is done when the value of "survival time" field meets in 0 at step B09 about the OFS.

(11) Step B11

When the value of the "survival time" field is not 0 at step B09, the OFS determines whether there is a matching flow entry in the existing flow entries of its own flow table, based on the data of the "source address" field and the "destination address" field in the header section of the packet.

(12) Step B12

When there is the matching flow entry at step B11, the OFS confirms whether or not there is a value identical to the value written in the "test ID" field of the test packet in the "test ID" field of the flow entry.

(13) Step B13

Because a closed loop is detected, when there is the identical value at step B12, the OFS determines the test failure.

(14) Step B14

When there is not the identical value at step B12, the OFS determines that the closed loop has not been formed currently, and confirms whether or not the destination of the flow entry is a host.

(15) Step B15

When the destination of the flow entry is the host at step B14, the OFS determines to be in the test success because it is detected that the closed loop is not formed and the routing is possible.

(16) Step B16

The OFS stores the value showing the test result in the "test success/failure flag" field of the test packet. Here, when the processing flow passes through step B10, the OFS stores "3" in the "test success/failure flag" field of the test packet to show the failure of the test due to the expiration of survival time. Also, when the processing flow passes through step B13, the OFS stores "2" in the "test success/failure flag" field of the test packet to show the test failure due to the formation of a closed loop. Also, when the processing flow passes through step B15, the OFS stores "1" in the "test success/failure flag" field of the test packet to show the test success.

(17) Step B17

The OFS refers to a MAC address of the end portion of the "passage OFS data" field of the test data section of the test packet and transfers the test packet to an OFS previous to the OFS by one or immediately before the OFS and completes the test at this point.

(18) Step B18

When there is not the matching flow entry at step B11, the OFS inquires a route to the OFC. The OFC calculates the route.

(19) Step B19

The OFC temporarily registers a flow entry on the OFS based on the calculation result. The OFC writes the effect which the transfer is based on the temporarily registered flow entry in the "action" field of the temporarily registered flow entry.

(20) Step B20

The OFS stores the test ID in the flow entry. At this time, when another flow entry is already stored, this means the execution state of another test. Generally, because the test completes in a short time, the completion of the other test is waited and then, after the existing test ID is deleted by the clean-up processing, the test ID of the test packet is stored. Here, the OFS writes the value of the "test ID" field of the test packet in the "test ID" field of the matching flow entry, when passing through step B14. Also, the OFS writes the value written in the "test ID" field of the test packet in the "test ID" field of the temporarily registered flow entry when passing through step B19.

(21) Step B21

The OFS writes the MAC address of the OFS itself and a port number in the "passage OFS data" field of the test packet, subtracts "1" from the value of "survival time" field of the test packet and transfers it according to the entry.

(22) Step B22

Also, when the value showing the test success or the value showing the test failure is set in the "test success/failure flag" field at step B08 (when a value other than "0" is set), this means the reflection processing state of the test result. When seeing the MAC address of the end portion of the "passage OFS data" field of the test data section of the test packet in the OFS, the MAC address of the OFS should be written. The OFS deletes its own MAC address from the end portion of the "passage OFS data" field of the test data section of the test packet.

(23) Step B23

The OFS searches the flow entry that the value identical to the value written in the "test ID" field of the test packet is written into the "test ID" field, from among the flow entries registered on its own flow table.

(24) Step B24

The OFS refers to the "action" field of the searched flow entry and determines whether the flow entry is a temporarily registered flow entry or a normally registered flow entry.

(25) Step B25

The OFS refers to the "test success/failure flag" of the test packet when the flow entry is the temporarily registered flow entry as a result of step B24.

(26) Step B26

As a result of step B25, the OFS updates the temporarily registered flow entry to the normally registered flow entry, if the value showing the test success is stored in the "test success/failure flag" field. That is, the OFS updates the data showing the temporary registration and written in the "action" field of the flow entry, in the data showing the normal registration. For example, the OFS may make delete the data showing the temporary registration from the "action" field of the flow entry.

(27) Step B27

The OFS deletes the flow entry if the value showing the test failure is stored in the "test success/failure flag" field as a result of step B25.

(28) Step B28

When the flow entry is normally registered flow entry as a result of step B24, the OFS deletes the value of the test ID written in the "test ID" field of the test packet from the "test ID" field of the flow entry regardless of the success/failure of the test.

(29) Step B29

The OFS refers to the "passage OFS data" field of the test data section of the test packet and confirms whether or not there are one or more MAC addresses.

(30) Step B30

When it is confirmed in step B29 that there are one or more MAC addresses, the OFS transfers the test packet to an OFS having a MAC address of the end portion of the "passage OFS data" field.

(31) Step B31

In step B29, when there is no MAC address, this means that the test packet has returned to the OFS of a test packet generation source. The OFS refers to the "test success/failure flag" field of the test packet and confirms the success/failure of the test.

(32) Step B32

The OFS transfers the packet in the pending state at step B07 according to the flow entry when the test has succeeded at step B31. Also, the OFS discard the test packet.

(33) Step B33

The OFS discards the packet in the pending state at step B07 and returns an error to the OFC, when the test has failed at step B31. Also, the OFS discards the test packet.

(Effects of the Present Invention)

In the present invention, by use of the test packet, the formation of the closed loop can be checked previously and the result can be reflected on the flow entry registration. Therefore, it is not needed that the controllers such as the OFCs cooperates and the formation of the closed loop can be prevented.

Also, in the present invention, there is no a calculation element so that the process quantity increases linearly or more to the number of the OFC and the OFS in the closed loop forming test processing. Therefore, even if the scale of the network becomes large, the closed loop formation test can be executed as light-weight processing.

(Internal Configuration Example of OFS)

The internal configuration example of the OFS in the closed loop formation preventing system according to the present invention will be described with reference to FIG. 11.

Each of the OFS 11 (11-$j$, j=1 to y) is composed of a test packet confirming section 111, a flow entry confirming section 112, an inquiry processing section 113, a test packet generating section 114, a test executing section 115 and a temporarily registered flow entry discarding section 116.

The test packet confirming section 111 confirms whether or not the received packet is the test packet.

When the received packet is not the test packet, the flow entry confirming section 112 confirms whether or not there is a flow entry matching to the received packet in the existing flow entries of the flow table.

The inquiry processing section 113 inquires to the OFC 12 (12-$k$, k=1 to z) when there is no flow entry matching to the received packet.

The test packet generating section 114 generates the test packet based on the flow entry temporarily registered from the OFC 12 (12-$k$, k=1 to z).

The test executing section 115 retains the received packet, transfers the test packet according to the temporarily registered flow entry by the OFC 12 (12-$k$, k=1 to z) and starts the test to detect the closed loop generation.

The temporarily registered flow entry discarding section 116 discards the flow entry temporarily registered from the OFC 12 (12-$k$, k=1 to z) when detecting the closed loop generation as a result of the test.

It should be noted that the test packet confirming section 111, the flow entry confirming section 112, the inquiry processing section 113, the test packet generating section 114, the test executing section 115 and the temporarily registered flow entry discarding section 116 can be cooperated mutually.

(Details of Test Packet Generating Section)

The details of test packet generating section 114 will be described with refers to FIG. 12.

The test packet generating section 114 is composed of a field setting section 1141, a test packet identification data managing section 1142, a TTL managing section 1143, a test ID managing section 1144, a test result data initializing section 1145 and passage OFS data managing section 1146.

The field setting section 1141 provides the basic header section and the test data section for the test packet when the test packet is generated.

The test packet identification data managing section 1142 stores a value showing the test packet in the service-type field and the protocol-type field in the basic header section.

The TTL managing section 1143 copies the value written in the received packet to the survival time field in the basic header section.

The test ID managing section 1144 stores the test ID written in the temporarily registered flow entry from the OFC 12 (12-$k$, k=1 to z) in the test ID field of the test data section.

The test result data initializing section 1145 stores a value in the test success/failure flag field of the test data section to show the test incomplete status The passage OFS data managing section 1146 stores a value of the port number and the MAC address of the OFS 11 (11-$j$, j=1 to y) in the passage OFS data field of the test data section.

(Details in Test Executing Section)

The test executing section 115 will be described in detail with reference to FIG. 13.

The test executing section 115 is composed of a test success/failure flag confirming section 1151, a TTL confirming section 1152, a test ID confirming section 1153, a destination confirming section 1154, a test result data managing section 1155 and a test packet transferring section 1156.

When the received packet is the test packet, the test success/failure flag confirming section 1151 confirms a value of a test success/failure flag field of the test packet, and when the value is not set in the test success/failure flag field of the test packet or the value is 0, and determines that it is in the test processing.

The TTL confirming section 1152 confirms whether or not a value of a survival time field is 0 in case of being in the test processing. When the value of the survival time field of the test packet meets in "0", it determines that it expires the survival time of the packet, it determines the test failure of the TTL confirming section 1152. Also, when the value of the survival time field of the test packet is not "0", the TTL confirming section 1152 confirms whether or not it cooperates with the flow entry confirming section 112 of FIG. 11 and whether or not there is flow entry matching to the test packet in the existing flow entries of the flow table.

When the test packet matching to the test packet is searched, the test ID confirming section 1153 confirms whether or not the value identical to the value written in the test ID field of the test packet and when the same values exist, it is determined for the closed loop is generated and the test is determined to be in the test failure.

When there are no identical values, the destination confirming section 1154 determines that the closed loop is not yet formed, and confirms whether or not the destination of the flow entry is a host, and when the destination of the flow entry is the host, determines that the closed loop is not formed and that the routing can be made and the test is determined to in the test success.

The test result data managing section 1155 stores the value showing the test result in the test success/failure flag field of the test packet.

The test packet transferring section 1156 refers to a MAC address in the end portion of the passage OFS data field of the test packet and transfers it to the OFS 11 (11-$j$, j=1 to y) in which the test packet passed through and the test completes.
(When Un-Registration of Test Packet)

The processing when the test packet is unregistered below will be described.

Figure 11:
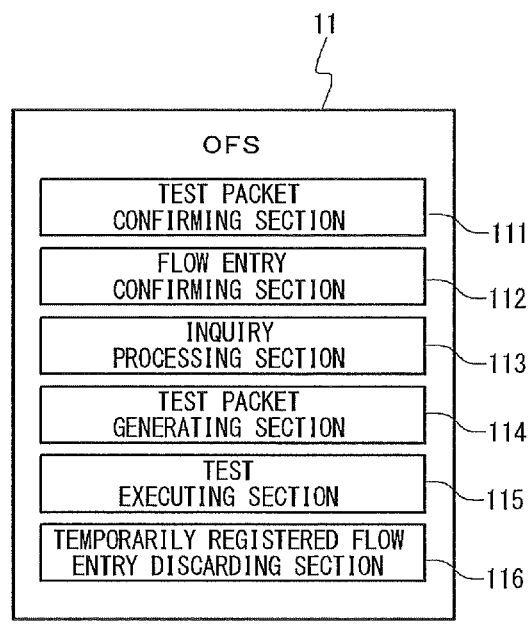
FIG. 11 is a diagram showing the internal configuration example of the OFS.

The inquiry processing section 113 of FIG. 11 inquires of the OFC 12 (12-$k$, k=1 to z) when there is not flow entry matching to the test packet.

Figure 12:
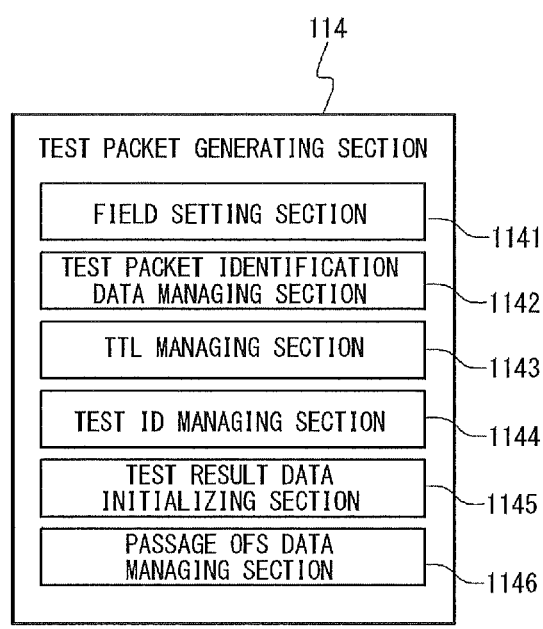
FIG. 12 is a diagram showing the details of a test packet generating section as one of the internal configurations of the OFS.

When the flow entry is temporarily registered from the OFC 12 (12-$k$, k=1 to z), the test ID managing section 1144 of FIG. 12, or when the destination of the flow entry matching to the test packet is not the host, A value written in the test ID field of the test packet is written into the test ID field of the flow entry.

The passage OFS data managing section 1146 of FIG. 12 stores a value of the port number and the MAC address of the OFS 11 (11-$j$, j=1 to y) in the passage OFS data field of the test packet.

The TTL managing section 1143 of FIG. 12 subtracts "1" from the value of the survival time field of the test packet.

Figure 13:
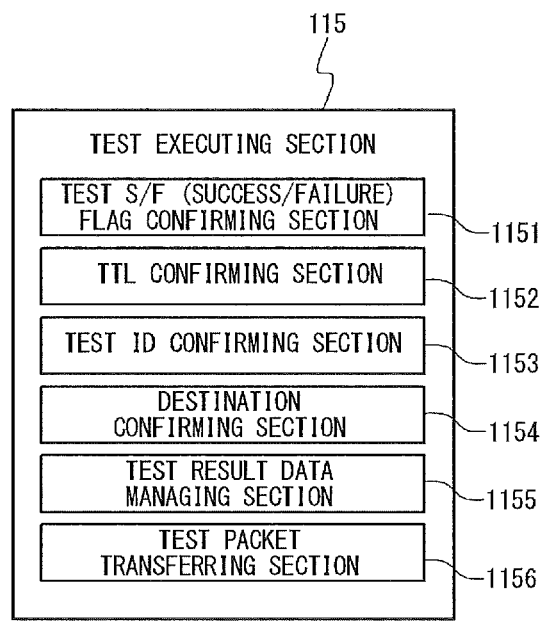
FIG. 13 is a diagram showing details at a test executing section as one of the internal configurations of the OFS.

The test packet transferring section 1156 of FIG. 13 transfers the test packet according to the flow entry and continues the test.

(When the Test was Already Executed)

The processing when the test has executed will be described below.

When a value other than "0" is set in the test success/failure flag field of the test packet (when the test is not incomplete), the passage OFS data managing section 1146 of FIG. 12 deletes the MAC address of the OFS 11 (11-$j$, j=1 to y) from the end portion of the passage OFS data field of the test packet.

The flow entry confirming section 112 of FIG. 11 searches a flow entry in which the value identical to the value written in the test ID field of the test packet is written in the test ID field, from among the flow entries registered on the flow table. The action field of the searched flow entry is referred to and it is determined whether the flow entry is a temporarily registered flow entry or a normally registered flow entry. When the flow entry is the temporarily registered flow entry, the test success/failure flag of the test packet is referred to in conjunction with the test success/failure flag confirming section 1151 of FIG. 13. When a value showing the test success is stored in the test success/failure flag field of the test packet, the temporarily registered flow entry is updated to a normally registered flow entry. When a value showing the test failure is stored in the test success/failure flag field of the test packet, the flow entry is deleted. When the flow entry is a normally registered flow entry, the value of the test ID written the test ID field of the test packet is deleted from the test ID field of the flow entry in conjunction with the test ID managing section 1144 of FIG. 12 regardless of the success/failure of the test.

The test packet transferring section 1156 of FIG. 13 refers to the passage OFS data field of the test packet and confirms whether or not there are one or more MAC addresses. When there are one or more MAC addresses in the passage OFS data field of the test packet, the test packet transferring section 1156 transfers the test packet to the OFS 11 (11-$j$, j=1 to y) which has the MAC address of the end portion of the passage OFS data field of the test packet, to continue the test. In the passage OFS data field of the test packet, when there is no MAC address, the test packet transferring section 1156 determines that the test packet has returned to the OFS 11 (11-$j$, j=1 to y) of a test packet generation source. At this time, when having returned to the OFS 11 (11-$j$, j=1 to y) of the test packet generation source, the test packet transferring section 1156 refers to the test success/failure flag field of the test packet in conjunction the test result data managing section 1155, to confirm the success/failure of the test. In case of the test success, the test packet transferring section 1156 transfers the retained received packet according to the normally registered flow entry. In case of the test failure, the test packet transferring section 1156 discards the retained received packet and returns an error to the OFC 12 (12-$k$, k=1 to z). After that, the test packet transferring section 1156 discards the test packet to complete the test.

(Internal Configuration Example of OFC)

An internal configuration example of the OFC in the closed loop forming prevention system according to the present invention will be described with reference to FIG. 14.

Each of the OFCs 12 (12-$k$, k=1 to z) is composed of a route calculating section 121, a test ID generating section 122 and a flow entry temporarily registering section 123.

The route calculating section 121 calculates a route when receiving an inquiry from the OFS 11 (11-$j$, j=1 to y).

The test ID generating section 122 generates the test ID which can uniquely identify the test.

The flow entry temporarily registering section 123 temporarily registers the flow entry which is based on the route calculation result on the OFS 11 (11-$j$, j=1 to y). At this time, the flow entry temporarily registering section 123 provides an action field and a test ID field in the temporarily registered flow entry. The flow entry temporarily registering section stores data showing the temporary registration in the action field, and stores a value of the test ID in the test ID field.
(Illustration of Hardware)

As an example of the host 10 (10-$i$, $i$=1 to x) and the OFC 12 (12-$k$, $k$=1 to z), computers such as a PC (personal computer), an appliance, a workstation, a mainframe, and a supercomputer are assumed. Besides, as an example of the host 10 (10-$i$, $i$=1 to x), a portable phone, a smart phone, a smart book, a car navigation system, a carrying-type game machine, a home-use game machine, a carrying-type music player, a handy terminal, a gadget (electronic equipment), an interactive TV, a digital tuner, a digital recorder, information home electronics (information home appliance), a POS (Point of Sale) terminal, OA (Office Automation) equipment, a store-front terminal and high function copy machine, a digital signage: an electronic signboard) and so on are exemplified. The host 10 (10-$i$, $i$=1 to x) and the OFC 12 (12-$k$, $k$=1 to z) may be installed or located in moving bodies such as a vehicle, a ship and an aircraft. It should be noted that the host 10 (10-$i$, $i$=1 to x) and the OFC 12 (12-$k$, $k$=1 to z) may be relay equipment and peripheral equipment in addition to the terminal and the server. Also, the host 10 (10-$i$, $i$=1 to x) and the OFC 12 (12-$k$, $k$=1 to z) may be an extension board mounted on a computer and so on, and a virtual machine (VM) built on a physical machine.

As an example of the OFS 11 (11-$j$, $j$=1 to y), a network switch is assumed. As an example of the network switch, an L3 switch (layer 3 switch), an L4 switch (layer 4 switch), an L7 switch/application switch (layer 7 switch), a multi-layer switch (multi-layer switch) and so on are exemplified. Besides, as an example of the OFS 11 (11-$j$, $j$=1 to y), a router (router), a proxy, a gateway, a firewall, a load balancer (load distribution unit), a band control system/security monitor and control equipment (gatekeeper), a base station, an access point (AP), a communications satellite (CS), a computer which has a plurality of communication ports, and so on are exemplified.

Although not illustrated, each of the above-mentioned host 10 (10-$i$, $i$=1 to x), the OFS 11 (11-$j$, $j$=1 to y) and the OFC 12 (12-$k$, $k$=1 to z) is realized by a processor which operates based on a program to execute a predetermined process, a memory which stores the program and data of all kinds, an interface used for communication with a network.

As an example of the above-described processor, a CPU (Central Processing Unit), a network processor (NP), a microprocessor, a microcontroller, a semiconductor integrated circuit (IC) and so on which have a function of an exclusive use are thought of.

Semiconductor memory devices such as a RAM (Random Access Memory), a ROM (Read Only Memory), an EEPROM (Electrically Erasable and Programmable Read Only Memory) and a flash memory, auxiliary storages such as a HDD (Hard Disk Drive) and SSD (Solid State Drive), a removable disk such as a DVD (Digital Versatile Disk), and storage media such as an SD memory card (secure digital memory card) are exemplified. Also, a buffer and a register may be used. Or, storage apparatuses such as DAS (Direct Attached Storage), FC-SAN (Fibre Channel-Storage Area Network), NAS (Network Attached Storage), and IP-SAN (IP-Storage Area Network) may be used.

It should be noted that the above-described processor and memory may be united. For example, in recent years, a microcomputer is produced on one chip. Therefore, a case that the 1-chip microcomputer which is mounted on the electronic equipment and so on is composed of the above-described processor and memory is thought of.

As an example of the above-described interface, the substrate (motherboard, I/O board) and a chip such as a semiconductor integrated circuit which conform to network communication, a network adapter such as NIC (Network Interface Card) and similar expansion card, a communication device such as an antenna, and communication ports such as a connector are exemplified.

Also, as an example of the network, the Internet, a LAN (Local Area Network), a wireless LAN, a WAN (Wide Area Network), a backbone, a CATV line, a fixation telephone network, a mobile phone network, WiMAX (IEEE 802. 16a), 3G (3rd Generation), a dedicated line (lease line), IrDA (Infrared Data Association), Bluetooth (registered trademark), a serial communication line, a data bus and so on are exemplified.

It should be noted that the host 10 (10-$i$, $i$=1 to x), the OFS 11 (11-$j$, $j$=1 to y) or the OFC 12 (12-$k$, $k$=1 to z) may be a virtual machine (VM) built on a physical machine.

Also, each section (of internal configuration) of each of the host 10 (10-$i$, $i$=1 to x), the OFS 11 (11-$j$, $j$=1 to y) or the OFC 12 (12-$k$, $k$=1 to z) may be a module, a component, an exclusive use device or these start-up (call) programs.

However, the present invention is not limited to these examples.
(Summary)

At described above, in the present invention, the formation of a closed loop can be prevented previously in the open flow (OpenFlow) network.

Specifically, in the present invention, the registration of a flow entry forming a closed loop can be prevented previously without cooperation of controllers such as OFCs and a procedure, in an open flow network in which there are a plurality of networks, in each of which a single OFC controls a plurality of OFSs, and a large network is formed through a combination of them.

In the present invention, whether or not a closed loop is formed is estimated prior to the registration of a flow entry generated by the OFC on the OFS.

Also, in the present invention, route evaluation is carried out by using the flow entry in the temporary registration and a test packet.

Also, in the present invention, the route evaluation from the start of a test to determination of a test result and reflection of the test result can be autonomously carried out only through the interaction of the test packet and a group of OFSs, without needing a component or a procedure of monitoring a behavior of the test packet, and a component or a procedure of collecting and analyzing the monitoring result.

The present invention can be realized only by updating the software of the OFC and updating of the firmware of the OFS.

The present invention can be used for a test of the closed loop formation in the open flow network system.

As described above, the exemplary embodiments of the present invention have been described in detail. However, actually, the present invention is not limited to the above-described exemplary embodiments, and a modification of the present invention in a range which does not apart from the scope of the present invention is also contained in the present invention.

The present invention claims a priority on a convention based on Japan Patent Application No. JP 2010-257781. The disclosure thereof is incorporated herein by reference.

The invention claimed is:

1. A closed loop formation preventing system comprising:
a switch configured to receive a packet and transfer the packet based on a flow entry registered on a flow table; and
a controller configured to register the flow entry on the flow table in response to an inquiry from said switch,
wherein said switch comprises:
means for confirming whether or not the received packet is a test packet;
means for confirming whether or not there is the flow entry matching the received packet in existing flow entries of the flow table, when the received packet is not the test packet;
means for inquiring to said controller when there is no flow entry matching to the received packet;
generating means for generating the test packet based on the flow entry temporarily registered from said controller;
means for retaining the received packet, transferring the test packet based on the temporarily registered flow entry and starting a test for detecting formation of a closed loop; and
means for discarding the temporarily registered flow entry when detecting the formation of the closed loop as a result of the test.

2. The closed loop formation preventing system according to claim 1, wherein said controller comprises:
means for calculating a route when receiving an inquiry from said switch;
means for generating a test ID which can uniquely identify the test;
means for temporarily registering the flow entry, which is based on a result of the route calculation, on the flow table of said switch;
means for providing an action field and a test ID field in the temporarily registered flow entry;
means for storing data showing a temporary registration in the action field; and
means for storing a value of the test ID in the test ID field.

3. The closed loop formation preventing system according to claim 2, wherein said switch further comprises:
means for providing a basic header section and a test data section for the test packet when generating the test packet;
means for storing a value showing the test packet in a service type field and a protocol type field of the basic header section;
means for copying a value written in the received packet into a survival time field of the basic header section;
means for storing the test ID written in the temporarily registered flow entry in the test ID field of the test data section;
means for storing a value showing a test incomplete status in a test success/failure flag field of the test data section; and
means for storing a value of a port number and a MAC address of said switch in a passage OFS data field of said test data section.

4. The closed loop formation preventing system according to claim 3, wherein said switch further comprises:
means for referring to the value of the test success/failure flag field of the test packet when the received packet is the test packet;
means for determining a test processing state when any value is not set in the test success/failure flag field of the test packet or when the value of "0" is set in the test success/failure flag field, and confirming whether or not a value of the survival time field of the test packet is 0;
means for determining expiration of a survival time of the test packet when the value of the survival time field of the test packet is "0", and determining test failure;
means for confirming whether or not there is a flow entry matching to the test packet in the existing flow entries of the flow table when the value of the survival time field of the test packet is not "0";
means for confirming, when there is the flow entry matching to the test packet, whether or not there is a value identical to the value written in the test ID field of the test packet, in the test ID field of the matching flow entry;
means for determining that the closed loop has been formed when there is the identical value, and determining the test failure;
means for determining that the closed loop has not been formed currently, when there is not the identical value, and confirming whether or not a transfer destination of the flow entry is a host;
means for determining that a routing is possible and determining test success, when the transfer destination of the flow entry is the host;
means for storing a value showing a test result in the test success/failure flag field of the said test packet; and
means for referring to a MAC address in an end portion of the passage OFS data field of the test packet and transferring the test packet to a switch through which the test packet passed immediately before, to complete the test.

5. The closed loop formation preventing system according to claim 4, wherein said switch further comprises:
means for inquiring to said controller when there is not any flow entry matching to the test packet;
means for copying the value written in the test ID field of the test packet into the test ID field of a specific flow entry as one of the temporarily registered flow entry registered from said controller and the matching flow entry in which the transfer destination is not said host;
means for storing a value of the port number and the MAC address of said switch in the passage OFS data field of the test packet;
means for subtracting "1" from the value of the survival time field of the test packet; and
means for transferring the test packet based on the specific flow entry to continue the test.

6. The closed loop formation preventing system according to claim 4, wherein said switch further comprises:
means for deleting the MAC address of said switch from the end portion of the passage OFS data field of the test packet when the value of "0" is set in the test success/failure flag field of the test packet;
means for searching a flow entry, in which the value identical to the value written in the test ID field of the test packet is written in the test ID field, from among the flow entries registered on the flow table;
means for referring to the action field of the searched flow entry and determining whether the searched flow entry is a temporarily registered flow entry or a normally registered flow entry;
means for referring to the test success/failure flag of the test packet when the searched flow entry is the temporarily registered flow entry;
means for updating the searched flow entry to the normally registered flow entry when the value showing the test success is stored in the test success/failure flag field of the test packet;

means for deleting the searched flow entry when the value showing the test failure is stored in the test success/failure flag field of the test packet;
means for deleting the value of the test ID written the test ID field of the test packet from the test ID field of the searched flow entry, regardless of the test success/failure, when the searched flow entry is the normally registered flow entry;
means for referring to the passage OFS data field of the test packet and confirming whether or not there are one or more MAC addresses;
means for transferring the test packet to a switch having a MAC address in the end portion of the passage OFS data field of the test packet to continue the test when there are one or more MAC addresses in the passage OFS data field of the test packet;
means for determining that the test packet has returned to a test packet generation source switch, when there is no MAC address in the passage OFS data field of the test packet, and referring to the test success/failure flag field of the test packet to confirm the test success/failure;
means for transferring the retained received packet based on the normally registered flow entry in case of the test success;
means for discarding the retained received packet in case of the test failure and returning an error to said controller; and
means for discarding the test packet and completing the test.

7. A switch comprising:
means for confirming whether or not a received packet is a test packet;
means for confirming whether or not there is a flow entry matching to the received packet in existing flow entries of a flow table when the received packet is not the test packet;
means for transferring, when there is the flow entry matching to the received packet, the received packet based on the matching flow entry;
means for issuing an inquiry to a controller when there is no flow entry matching to the received packet;
means for generating the test packet based on a flow entry temporarily registered from said controller;
means for retaining the received packet, transferring the test packet based on the temporarily registered flow entry, and starting a test to detect formation of a closed loop; and
means for discarding the temporarily registered flow entry when detecting the closed loop formation forming as a result of the test.

8. A closed loop formation preventing method executed by a switch, said method comprising:
confirming whether or not a received packet is a test packet;
confirming whether or not there is a flow entry matching to the received packet in existing flow entries of a flow table when the received packet is not a test packet;
transferring, when there is the flow entry matching to the received packet, the received packet based on the matching flow entry;
issuing an inquiry to a controller when there is not any flow entry matching to the received packet;
generating the test packet based on a temporarily registered flow entry temporarily registered from said controller;
retaining the received packet;
transferring the test packet based on the temporarily registered flow entry to start the test for detecting formation of a closed loop; and
discarding the temporarily registered flow entry when detecting the formation of the closed loop as a test result.

9. A non-transitory computer-readable recording medium which stores a computer-executable program to make a switch execute a closed loop formation preventing method which comprises:
confirming whether or not a received packet is a test packet;
confirming whether or not there is a flow entry matching to the received packet in existing flow entries of a flow table when the received packet is not a test packet;
transferring, when there is the flow entry matching to the received packet, the received packet based on the matching flow entry;
issuing an inquiry to a controller when there is no flow entry matching to the received packet;
generating a test packet based on a temporarily registered flow entry temporarily registered from said controller;
retaining the received packet;
transferring the test packet based on the temporarily registered flow entry to start the test for detecting formation of a closed loop; and
discarding the temporarily registered flow entry when the formation of the closed loop is detected as a test result.

* * * * *